United States Patent
D'Amato et al.

(10) Patent No.: US 10,275,302 B2
(45) Date of Patent: Apr. 30, 2019

(54) SYSTEM RELIABILITY BY PRIORITIZING RECOVERY OF OBJECTS

(71) Applicant: MICROSOFT TECHNOLOGY LICENSING, LLC, Redmond, WA (US)

(72) Inventors: Andrea D'Amato, Kirkland, WA (US); Vyacheslav Kuznetsov, Sammamish, WA (US); Vinod Shankar, Woodinville, WA (US); Karan Mehra, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 130 days.

(21) Appl. No.: 14/974,910

(22) Filed: Dec. 18, 2015

(65) Prior Publication Data

US 2017/0177427 A1 Jun. 22, 2017

(51) Int. Cl.
- G06F 11/00 (2006.01)
- G06F 11/07 (2006.01)
- G06F 11/10 (2006.01)

(52) U.S. Cl.
CPC ........ *G06F 11/079* (2013.01); *G06F 11/0727* (2013.01); *G06F 11/0754* (2013.01); *G06F 11/0793* (2013.01); *G06F 11/1088* (2013.01)

(58) Field of Classification Search
CPC . G06F 11/079; G06F 11/0793; G06F 11/0727
See application file for complete search history.

(56) References Cited

U.S. PATENT DOCUMENTS

| | | | |
|---|---|---|---|
| 6,516,425 B1 * | 2/2003 | Belhadj | G06F 11/1092 714/15 |
| 6,647,514 B1 * | 11/2003 | Umberger | G06F 11/1092 714/42 |
| 6,928,509 B2 | 8/2005 | Surugucchi | |
| 7,305,579 B2 * | 12/2007 | Williams | G06F 11/1092 714/6.32 |

(Continued)

FOREIGN PATENT DOCUMENTS

| | | |
|---|---|---|
| WO | 2009129054 A2 | 10/2009 |
| WO | 2014113066 A1 | 7/2014 |

(Continued)

OTHER PUBLICATIONS

Bhagwat, et al., "Providing High Reliability in a Minimum Redundancy Archival Storage System", In Proceedings of 14th IEEE International Symposium on Modeling, Analysis, and Simulation of Computer and Telecommunication Systems, Sep. 11, 2006, 9 pages.

(Continued)

*Primary Examiner* — Philip Guyton
(74) *Attorney, Agent, or Firm* — Workman Nydegger

(57) ABSTRACT

Recovery requests are scheduled and prioritized according to priority valuations of the minimum time to next failure relative to the minimum time to next recovery for corresponding storage data sets. The prioritization can be performed by an upper layer recovery scheduler that dispatches requests to different storage units and/or by lower layers and individual storage unit schedulers. Prioritizations can be reflected in tagging on recovery requests, as determined by a first entity, and/or determined dynamically at the point of dispatch and processing.

17 Claims, 6 Drawing Sheets

(56) References Cited

U.S. PATENT DOCUMENTS

| | | | |
|---|---|---|---|
| 8,732,518 B2 | 5/2014 | Storer et al. | |
| 9,032,245 B2 | 5/2015 | Roh | |
| 9,075,773 B1* | 7/2015 | Rakitzis | G06F 11/2094 |
| 2008/0267024 A1 | 10/2008 | Verschaeve | |
| 2010/0017650 A1 | 1/2010 | Chin et al. | |
| 2011/0066803 A1* | 3/2011 | Arakawa | G06F 11/1088 |
| | | | 711/114 |
| 2011/0302137 A1 | 12/2011 | Dawkins et al. | |
| 2013/0290775 A1* | 10/2013 | Tucek | G06F 11/0727 |
| | | | 714/6.22 |
| 2014/0365819 A1* | 12/2014 | Cooper | G06F 11/1092 |
| | | | 714/6.22 |
| 2015/0113324 A1* | 4/2015 | Factor | H04L 67/1097 |
| | | | 714/20 |

FOREIGN PATENT DOCUMENTS

| | | |
|---|---|---|
| WO | 2015-114643 | 8/2015 |
| WO | 2015132690 A1 | 9/2015 |

OTHER PUBLICATIONS

Gunawi, et al., "Improving File System Reliability with I/O Shepherding", In Proceedings of Twenty-First ACM SIGOPS Symposium on Operating Systems Principles, Oct. 14, 2007, pp. 293-306.

Lefevre, Jeffrey P., "Improving Disk Array Reliability and Performance", In Master Thesis of University of California, Retrieved on: Oct. 12, 2015, 96 pages.

Prakash, et al., "Improving RAID Performance and Reliability with Non-volatile Write Journals", In Publication of RTC Magazine, Mar. 2010, pp. 1-5.

Burkhard, et al., "Disk Array Storage System Reliability", In Proceedings of Twenty-Third International Symposium on Fault-Tolerant Computing, Jun. 22, 1993, pp. 432-441.

International Search Report and the Written Opinion issued in PCT Patent Application No. PCT/US2016/065687 dated May 4, 2017.

* cited by examiner

SYSTEM RELIABILITY BY PRIORITIZING RECOVERY OF OBJECTS

BACKGROUND

There are many different types of storage devices, including standalone and distributed storage devices, each of which can be broadly referred to as a storage unit. For instance, a standalone storage device can be referred to as a storage unit. Likewise, a distributed set of storage devices that are logically arranged for utilization by one or more entities can also be referred to as a storage unit.

A storage unit can include any combination of one or more drive(s), array(s), rack(s), or other storage device(s), including mechanical hard disk drives (HDD) with moving parts, and solid-state drives (SSD) with virtually no moving parts.

Various types of data can be contained within a storage unit, including electronic files, images and other data. Stored data can be referred to broadly as a data set, whether it includes multiple files or is limited to only a single file.

Sometimes, data sets become corrupted or otherwise inaccessible due to software and/or hardware failures. The durability of the data sets and overall resiliency to storage failures can be significantly improved my replicating the data sets in different storage locations.

Mirroring operations, for instance, make one or more redundant copies or replicas of a data set. These copies can be stored within a single storage unit or within multiple separate storage units. When a failure occurs, affecting one or more of the copies, a new copy must be made before the last copy is lost, or else the failure will be relatively catastrophic and the data will be irrecoverable. While mirroring is very robust, it can also be computationally expensive to implement.

RAID (redundant array of independent disks) technologies can also be implemented to protect against storage failures, without the same computational expense as mirroring techniques. With a RAID system, data is split or striped into different symbols that are stored with partity data in different storage locations. When one symbol becomes inaccessible due to a failure, the remaining symbols can be used to recover the lost symbol through XOR'ing processes utilizing the partity data.

RAID systems can be configured with single parity configurations and multiple parity configurations. For single parity configurations, the stored data and corresponding parity data is typically split into three symbols (e.g., D1 (partial data), D2 (partial data) and P (partity information)). A data set that is stored in the foregoing manner can survive a failure of any single symbol and still be reconstructed. For instance, a failure resulting in the loss of either D1, D2 or P is recoverable, by utilizing the alternate two symbols to reconstruct the lost data symbol through XOR'ing reconstruction processes. However, two or more concurrent failures that result in the cumulative loss of D1 and D2, or D1 and P, or D2 and P will be relatively catastrophic, such that it will not be possible to perform the XOR'ing reconstruction processes and the lost data will be irrecoverable.

A multiple parity configuration, such as LRC (longitudinal redundancy check), can survive multiple concurrent symbol losses without suffering catastrophic failure, by utilizing layered and global parity symbols. However, even with a multiple parity configuration, the reconstruction/recovery processes must be completed before too many symbols are lost (e.g., before the data set is reduced to a single symbol), or else it can still become impossible to perform the XOR'ing reconstruction processes.

Mirroring and RAID technologies can be implemented alone and in combination, utilizing one or more shared storage units. However, sharing of storage units can create bandwidth issues. For example, a storage unit (e.g, drive, array, rack, etc.) typically has a limited bandwidth, meaning that it is only able to perform some limited number of I/O operations within a given period of time. The number of I/O operations that can be performed can be further reduced when some or all of the I/O operations are particularly costly in terms of time to perform the operations. These I/O operations include application operations as well as the restitution and reconstruction recovery operations described above.

When there are contentions for bandwidth amongst multiple entities, it is desirable that a storage system should be able to accommodate all of the entities. However, if one or more of the entities is given higher priority than other entities, the higher priority entities may, in effect, block other entities from accessing a desired storage unit. Likewise, high priority operations can also effectively block lower priority operations from being performed.

In some instances, priority contests may result in recovery operations being delayed or blocked until it is too late. For instance, a recovery operation being delayed until a last copy of a data set is lost (in a mirror configuration) or until a critical symbol is lost (in a RAID partity configuration) will be relatively catastrophic. This can be particularly problematic in distributed systems that utilize multiple shared storage units having different storage traits and that are utilized to perform many different I/O operations, with dynamically changing storage conditions.

Thus, it would be useful to have a system that is able to manage storage unit bandwidth and to, even more specifically, dynamically prioritize recovery of data sets within corresponding storage units.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

According to one embodiment, recovery requests are scheduled and prioritized according to priority valuations of a minimum time to next failure relative to a minimum time to next recovery for corresponding storage data sets.

In some embodiments, the recovery requests are scheduled and prioritized according to priority valuations based on differentiating between next failures that are not critical (e.g., failures that do not result in a reducing a data set to a single remaining copy or to a last critical set of symbols required for XOR'ing reconstruction) and next failures that are critical (e.g., failures that do result in reducing a data set to a single remaining copy or that reduce parity symbols for a data set to a critical quantity of variety of symbols required to enable XOR'ing reconstruction).

The prioritizations are performed by an upper layer recovery scheduler that dispatches requests to different storage units and/or by lower layers and individual storage unit schedulers. In some instances, prioritizations are reflected in tagging information provided with recovery requests. Prioritizations are determined subsequent to receiving a recovery request at the point of dispatch and/or subsequent to dispatch and prior to processing.

In one embodiment, the prioritization is performed at least in part at an upper layer of a system that includes one or more processors, one or more storage units storing one or more data sets, and one or more storage devices having stored computer-executable instructions which are executable by the one or more processors to cause the computing system to at least instantiate or manage a recovery scheduler. The recovery scheduler is configured to obtain one or more recovery requests corresponding to the one or more data sets, schedule an ordering for dispatching the one or more recovery requests to the one or more storage units based on a priority valuation of a minimum time to next failure relative to a minimum time to next recovery for the corresponding storage data sets and/or based on distinguishing between critical and non-critical failures, and to dispatch recovery requests to the one or more storage units based on the scheduled ordering.

In one embodiment, the prioritization is performed at least in part at a lower layer of a system that includes one or more processors, one or more storage units storing one or more data sets, and one or more storage devices having stored computer-executable instructions which are executable by the one or more processors to cause the computing system to at least instantiate or manage a storage unit scheduler for scheduling processing of recovery requests by the storage unit. The storage unit scheduler is configured to receive one or more recovery requests corresponding to one or more data sets associated with the storage unit and to obtain processing priority information for the one or more recovery requests, wherein the processing priority information is based on a priority valuation of a minimum time to next failure relative to a minimum time to next recovery for the corresponding data sets and/or based on distinguishing critical failures from non-critical failures. The storage unit scheduler is also configured to generate an ordered sequence for processing the one or more recovery requests by the storage unit based on the processing priority information and to cause the storage unit to process the one or more recovery requests in the ordered sequence.

Some embodiments also incorporate combinations of the foregoing, in whole and/or in part. For instance, embodiments of this disclosure include systems that are configured with the upper layer recovery scheduler in addition to the lower layer storage unit scheduler.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments of this disclosure relate to scheduling and prioritizing recovery requests according to priority valuations that include a minimum time to next failure relative to a minimum time to next recovery for corresponding storage data sets stored in one or more storage units.

Embodiments of this disclosure also relate to scheduling and prioritizing recovery requests according to priority valuations based on differentiating between next failures that are not critical (e.g., failures that do not result in a reducing a data set to a single remaining copy or to a last critical set of symbols required for XOR'ing reconstruction) and next failures that are critical (e.g., failures that do result in reducing a data set to a single remaining copy or that reduce parity symbols for a data set to a critical quantity of variety of symbols required to enable XOR'ing reconstruction).

The prioritizations are executed by an upper layer recovery scheduler that dispatches requests to different storage units and/or by lower layers and individual storage unit schedulers. For instance, prioritizations are determined subsequent to receiving a recovery request at the point of dispatch and/or subsequent to dispatch and prior to being processed by the storage unit(s).

In some instances, prioritizations are reflected by and/or controlled by tagging information that is provided with and/or that is referenced by the corresponding recovery requests.

Figure 1:
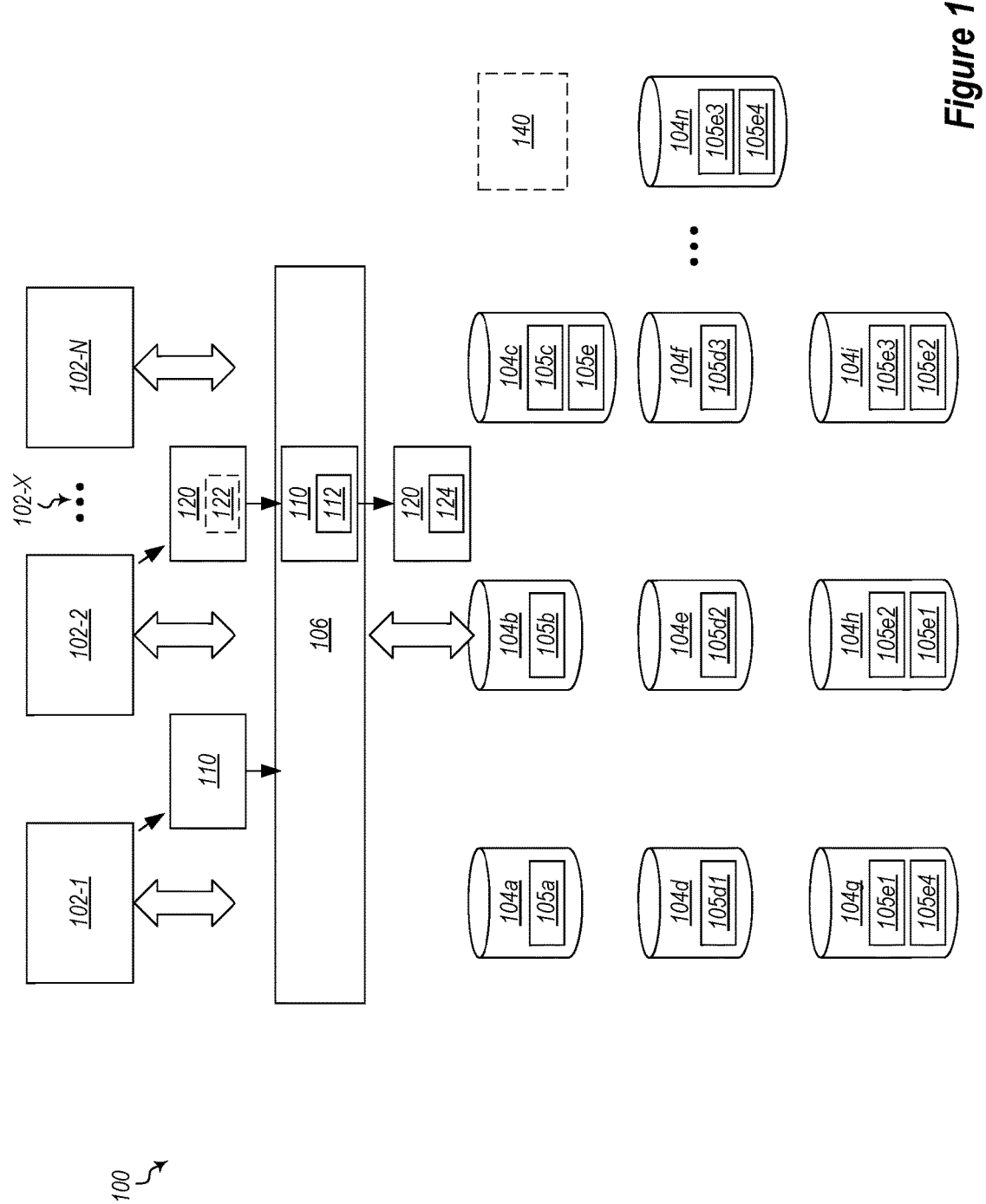
FIG. 1 illustrates a plurality of entities, a plurality of storage units and an upper layer recovery scheduler configured to facilitate interfacing of recovery requests between the entities and the storage units.
Figure 2:
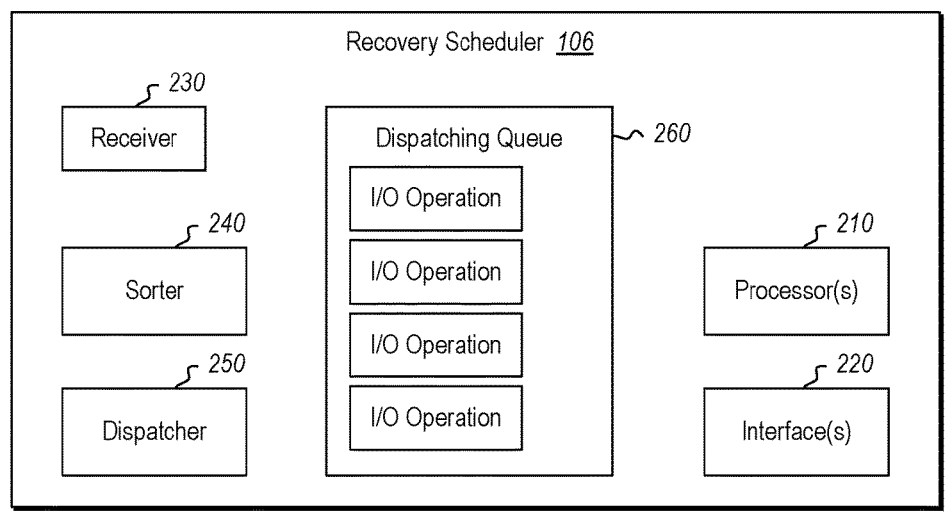
FIG. 2 illustrates an embodiment of the upper layer recovery scheduler of FIG. 1, with several components configured for enabling prioritizing of and/or scheduled dispatch of recovery requests to the storage units.
Figure 3:
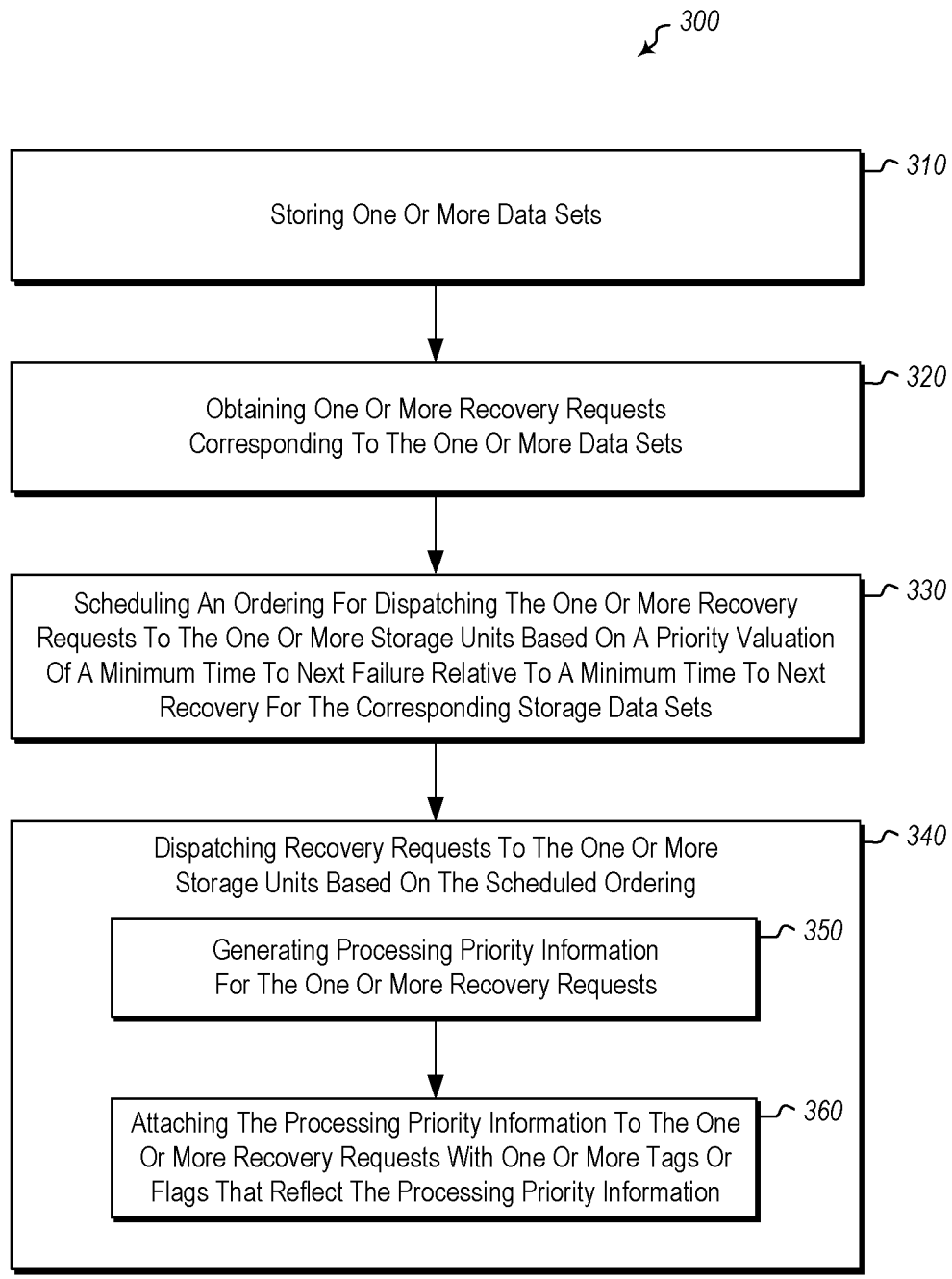
FIG. 3 illustrates a flow diagram of acts associated with methods for the upper layer recovery scheduler prioritizing and/or scheduling dispatch of recovery requests to one or more storage unit(s)

FIGS. 1, 2 and 3 correspond specifically to embodiments in which the prioritization is performed at least in part by an upper layer recovery scheduler that is configured to obtain one or more recovery requests corresponding to the one or more data sets, schedule an ordering for dispatching the one or more recovery requests to the one or more storage units based on a priority valuations of a minimum time to next failure relative to a minimum time to next recovery for the corresponding storage data sets and/or by distinguishing between critical failures and non-critical failures, and to dispatch recovery requests to the one or more storage units based on the scheduled ordering.

Figure 4:
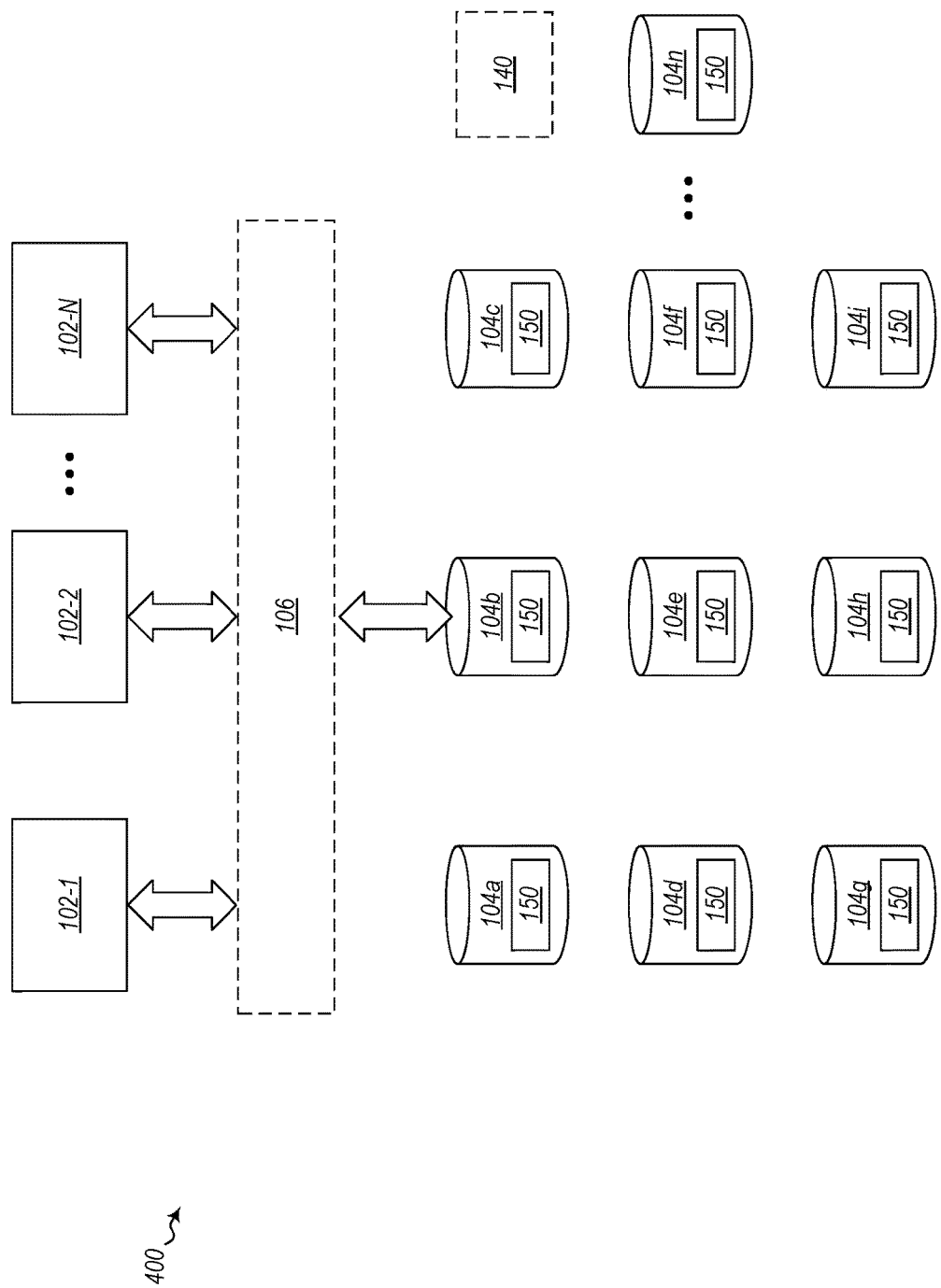
FIG. 4 illustrates a plurality of entities, a plurality of storage units and a lower layer storage unit scheduler configured to facilitate interfacing of recovery requests between the entities and the storage units.
Figure 5:
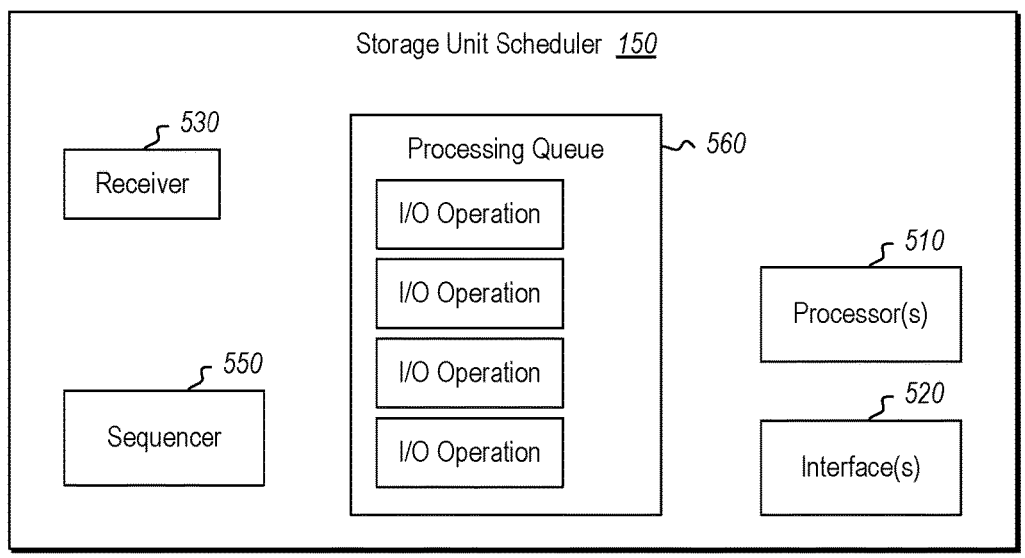
FIG. 5 illustrates an embodiment of the lower layer storage unit scheduler of FIG. 4, with several components configured for enabling receipt of, prioritizing of and/or scheduled processing of recovery requests by the storage units.
Figure 6:
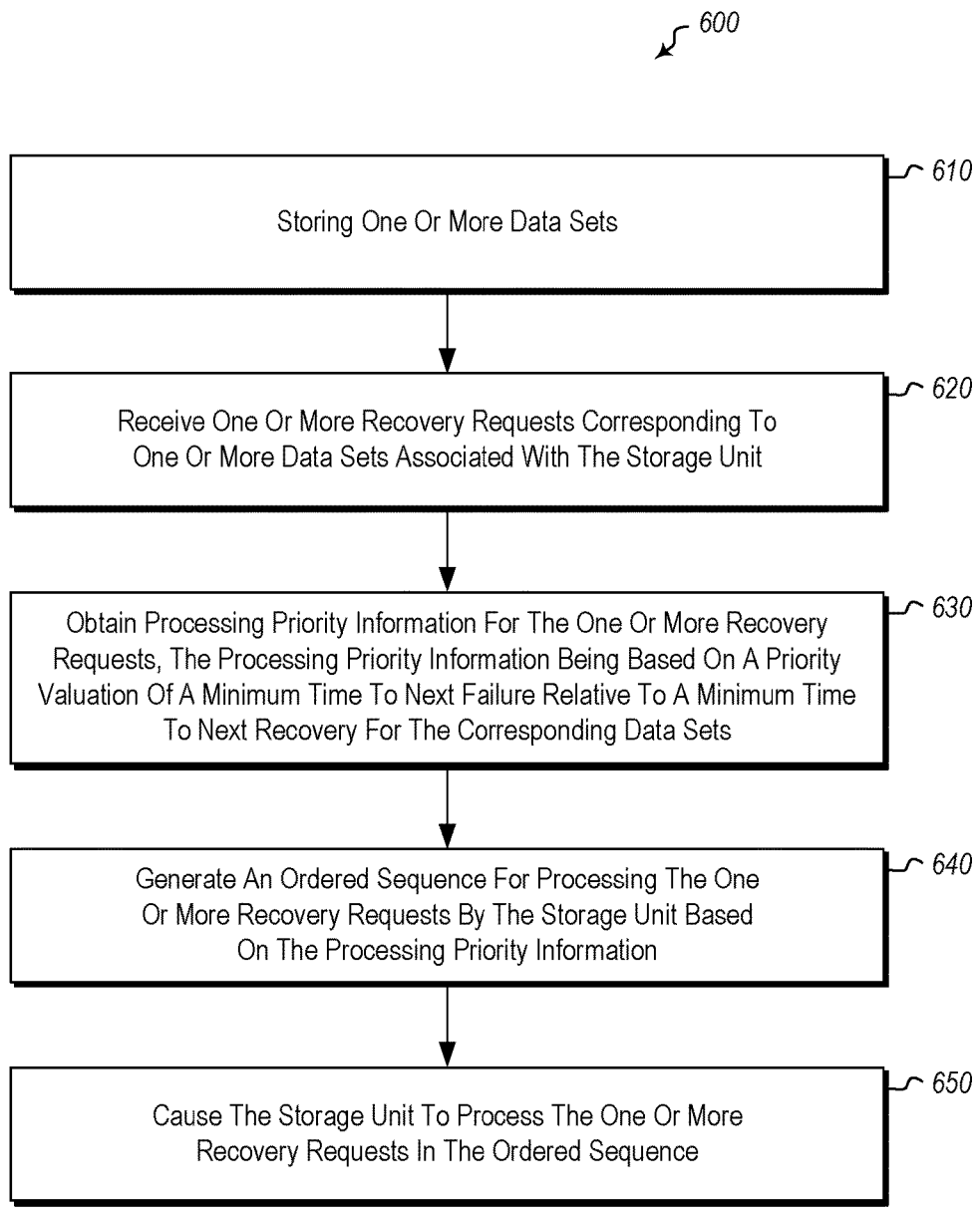
FIG. 6 illustrates a flow diagram of acts associated with methods for the lower layer storage unit scheduler receiving, prioritizing and/or scheduling processing of recovery requests by one or more storage unit(s).

FIGS. 4, 5 and 6 correspond specifically to embodiments in which the prioritization is performed at least in part by a lower layer storage unit scheduler configured to receive one or more recovery requests corresponding to one or more data sets associated with the storage unit and to obtain or generate processing priority information for the one or more recovery requests, wherein the processing priority information is based on a priority valuation of a minimum time to next failure relative to a minimum time to next recovery for the corresponding data sets and/or by distinguishing between critical failures and non-critical failures. The storage unit scheduler is also configured to generate an ordered sequence for processing the one or more recovery requests by the storage unit based on the processing priority information and to cause the storage unit to process the one or more recovery requests in the ordered sequence.

Some embodiments incorporate combinations of the foregoing, in whole and/or in part. For instance, embodiments of this disclosure include systems that are configured to instantiate and manage implementation of the upper layer recovery scheduler in addition to lower layer storage unit scheduler(s).

Referring now to FIG. 1, an example of a computing environment 100 is illustrated. FIG. 1 illustrates a plurality of entities 102-1, 102-2 and 102-n. Any quantity of entities may be included in this environment 100, as illustrated by ellipses 102-X. In some instances, one or more the entities are separate computer systems operating on separate processors and computer hardware. In some instances, one or more of the entities are applications, processes, virtual machines or other entities that are configured to share processors and other computing hardware components.

The entities are configured to initiate various I/O operations, such as reads and/or writes, which are performed on or with a combination of one or more of the illustrated storage unit(s) (104a, 104b, 104c, 104d, 104e, 104f, 104g, 104h, 104i and 104n). Each of these storage units may be configured as a standalone storage device or a distributed storage device, including any combination of one or more drive, an array, rack or other storage device. The storage units may also comprise different volumes, partitions or other logically separate portions of standalone or distributed storage.

In some embodiments, each of the storage units is hosted directly by a correspondingly separate one of the entities. In other embodiments, one or more of the storage units are shared between a plurality of the different entities.

Any of the entities (102-1 through 102-n) can implement I/O operations on data sets stored in one or more of the storage unit(s) (104a through 104n) by sending appropriate read/write requests to the appropriate storage unit(s). These requests, which can include recovery requests (e.g., mirroring requests, reconstruction requests, etc.), can be transmitted directly from the entities to the storage units or they can be routed through an intermediary, such as upper layer recovery scheduler 106, which may be configured as a remote proxy system, a virtual machine manager and/or load balancer.

The I/O operations may have different priorities assigned. For example application I/O operations may have a normal priority, while operations making duplicate copies of data for resiliency may be run at a relatively higher priority, especially when only a single at risk copy exists or when only a critical quantity of parity symbols remain. Other I/O operations, such as archiving and compressing data, or moving data to optimize storage performance may be run, in some embodiments, at a relatively lower priority.

The priorities can be explicitly specified and initially set by the different entities and/or by the upper layer recovery scheduler 106 with appropriate tagging. The upper layer recovery scheduler 106 can also dynamically modify previously specified priorities for some operations, based on newly detected conditions related to one or more I/O operations, one or more dynamic conditions associated with different data sets (e.g., detected corruption of data), and/or dynamic conditions associated with one or more of the storage units (e.g., detected hardware failure).

In some instances, the data sets are redundantly contained within the storage units as mirrored copies that are stored separately on different storage units (e.g, copy 105a and copy 105b) and/or on a single storage unit (e.g., copy 105c and copy 105d). The data sets can also be split up into different partial portions or symbols along with corresponding parity data (e.g., portion 105d1, portion 105d2, and parity data portion 105d3) that are stored in the same and/or different storage units.

The quantity of portions and copies that are stored, and storage locations, can vary to accommodate different single parity and multi-parity configurations, as well. For instance, in one embodiment, a data set is split into parity symbols that are all mirrored, with the various symbols being distributed among different storage locations (e.g., 105e1, 105e2, 105e3 and 105e4).

In some embodiments of the present disclosure, the upper layer recovery scheduler 106 is specifically configured to process and dispatch I/O operations that include recovery operations. These recovery operations are generally defined to include any read/write requests for mirroring or otherwise copying data and/or any read/write requests for XOR'ing parity data to restore lost data.

The upper layer recovery scheduler 106 initially schedules dispatch of operations to the storage units according to scheduling that is designed to ensure that I/O operations for certain entities can be given higher priority but that this does not cause low priority I/O operations to be completely blocked. This prioritizing/scheduling is based on entity type and/or operation type, in some embodiments. The prioritizing can also be based on detected conditions associated with data sets and/or storage units.

In some instances, the prioritizing is controlled by, specified by, or otherwise based on prioritizing data that is appended to or referenced by the different operation requests. The prioritizing data can be explicitly referenced with one or more tags that are added to the operation requests. The prioritizing data can also be inferentially referenced with pointers to one or more priority and/or degradation state table(s) 140 that contain explicit priority references and/or degradation state information associated with different data sets, storage units and operations.

In some embodiments, the priority and/or degradation state table(s) 140 include information that tracks quantities and locations of data set copies. This tracked information also includes information that identifies how many copies of the data set(s) remain accessible on operable drives and how many copies of the data set(s) have been corrupted and/or have become inaccessible due to storage failures.

In some instances, the degradation state table 140 and/or tagging information identifies a total quantity of available failure states that remain before a data set is irrecoverable.

The various storage locations can be periodically checked, on a predetermined schedule and/or in response to normal I/O operations, with read requests to verify accessibility. Read failures can be flagged in the degradation state information that is tracked.

In some embodiments, the priority and/or degradation state table(s) 140 include information that tracks how many symbols for corresponding data sets have been created and the quantity and/or variety of symbols that must remain accessible on operable drives in order to perform reconstruction of any lost symbols, for single parity and multi-partity configurations. The tracked data also identifies any symbols that have been lost or inaccessible due to storage failures.

When a storage failure results in a data set being reduced to a last copy from a plurality of copies and/or to a last critical set of parity symbols, that data set can be identified within the table(s) 140 as pertaining to a critical priority. Corresponding recovery requests associated with that data set can also be tagged with corresponding priority information and/or references to the information stored in the table(s).

When a new copy is made and/or the lost symbols are restored for a data set, the critical priority setting in the stored table(s) 140 can be modified to reflect the updates and a downgrading of the critical priority to a lower priority level.

In some embodiments, the table(s) 140 also include information that identifies minimum time for the next failures of the different data sets and/or storage units and the minimum time for next recoveries of the different data sets and/or storage units. These minimum times can be based on historical averages, trends and estimations based on the same data sets and/or storage units, or based on similar data sets and/or storage units. The minimum times can also be based on scheduled failure information corresponding to next failure(s) for the different data sets, including manufacturer hardware lifecycle information, and/or by software expiration information, that is used to estimate a time of a next estimated failure for hardware or software associated with the storage units or data sets.

The time information can be tracked as actual durations of time, as cycle counts and as relative times. In some instances, the time information specifies a time to next failure relative to a time to next recovery for particular data sets and/or storage units.

The priority table(s) and degredation state table(s) are referenced collectively as a single element 140 in the Figures. However, it will be appreciated that these table(s) 140 can include one or many tables that are configured as standalone and distributed tables and other data structures. The various information tracked by the table(s) 140 can also be stored as separate values contained in separate data fields and/or combined as composite strings of information.

Attention will now be directed to FIG. 2, which illustrates one embodiment of the upper layer recovery scheduler 106 of FIG. 1. While the upper layer recovery scheduler 106 is illustrated as a standalone element, it may also be distributed among a plurality of different systems, including one or more of the entities illustrated in FIG. 1. This may be particularly useful in scenarios where the entities each host one or more of the storage units.

As illustrated in FIG. 2, the recovery scheduler 106 includes or is associated with a plurality of different components that enable the functionality of the recovery scheduler 106. These different components include one or more processor(s) 210, interface(s) 220, a receiver 230, a sorter 240, a dispatcher 250 and a dispatching queue 260.

The processor(s) 210 implement computer-executable instructions that are stored on or that are accessible to a computing system that incorporates the recovery scheduler 106 to implement the functionality described in reference to at least the flow diagram of FIG. 3.

The interface(s) 220 include input fields and selectable objects configured to receive user input which, when received, controls settings for establishing prioritization and scheduling of the I/O operation requests. The interface(s) 220 also facilitate communications between the other illustrated components of the recovery scheduler 106, the storage unit scheduler 150 (shown in FIGS. 4 and 5), the prioritization and degradation state table(s) 140, and the various entities (102-1 thru 102-N).

The receiver 230 includes hardware and/or software for receiving and processing recovery requests and other I/O operation requests from the illustrated entities of FIG. 1.

The sorter 240 includes hardware and/or software for sorting the recovery requests and other I/O operation requests based on prioritization information contained within, referenced by, and/or that is otherwise associated with the received I/O operation requests. In some instances, the sorter 240 obtains this prioritization information from the table(s) 140. In other instances, the sorter 240 obtains this prioritization information directly from the entity sending the I/O operation request.

The recovery requests are sorted into an ordering based on the prioritization information. The sorter 240 can include and/or modify the prioritization tagging information contained within or that is referenced by the recovery requests based on conditions that are detected by the sorter 240 (e.g., by checking the table(s)) or that are otherwise reported to the sorter 240.

In some instances, the sorter 240 changes a relative scheduling/order of I/O operations from the order in which they were received and/or the ordering specified by the entities.

The dispatcher 250 includes hardware and/or software for dispatching the recovery requests and/or other I/O operation requests according to the prioritization ordering specified by the sorter 240. In some embodiments, this is accomplished by enqueuing the recovery requests and other operation requests in a dispatching queue according to a particular order. During operation, the enqueued I/O operation requests can be re-sorted according to newly detected conditions associated with the different storage units and/or data sets. The dispatcher can also add and/or modify the tagging prioritization information included with and/or referenced by the different I/O operation requests.

The dispatching queue 260 contains the various I/O operations (shown broadly as operations) until they are dispatched. The dispatching queue 260 dispatches the enqueued I/O operations according to a FIFO (first in first out) scheme and/or according to prioritization settings specified at the interface(s) 220 and/or by the tagging information that is included with or referenced by the different I/O operations.

FIG. 3 illustrates a flowchart 300 that includes a plurality of acts of a method that can be implemented by the recovery scheduler 106, according to embodiments of this disclosure, for scheduling and/or prioritizing recovery requests according to priority valuations within an upper layer of a system that includes one or more processors, one or more storage units storing one or more data sets, and one or more storage devices having stored computer-executable instructions which are executable by the one or more processors to cause the computing system to at least instantiate or manage the recovery scheduler 106.

As illustrated, the method includes storing one or more data sets (act 310) within one or more of the storage unit(s). Then, one or more of recovery requests are received (act 320), corresponding to one of more of the stored data sets. These recovery requests, for example, can include requests to replicate a copy of a data set, to replicate a symbol, and/or to reconstruct a lost symbol.

In some instances, the method includes scheduling an ordering for dispatching the one or more recovery requests to the one or more storage units based on a priority valuation of a minimum time to next failure relative to a minimum time to next recovery for the corresponding storage data sets (act 330). The ordering can also be based on distinguishing between critical failures and non-critical failures, as described above.

The scheduling of the prioritized ordering can include performing a query of stored degradation state information (e.g., stored information in table(s) 140) to obtain the information that is needed for prioritizing/scheduling.

The degradation state table information and prioritization information can also be maintained within the tagging information that is added to the individual recovery requests (e.g., by specifying a priority status, such as a critical priority status, a total number of failures associated with a data set or storage unit, an estimated time to recovery, an estimated time to next failure, etc.). Accordingly, the scheduling of the prioritized ordering can also include querying the tagging information has already been added to the recovery requests.

After the recovery requests are scheduled and enqueued for dispatching, they can be dispatched to the one or more storage units based on the scheduled ordering (act 340). In some instances, this dispatching process (act 340) includes generating, adding or otherwise modifying the processing priority information for the recovery requests (act 350), as described above. This can include, for instance, adding or modifying the processing priority information corresponding to each of the recovery requests with explicit tagging information, flags or inferential pointers to other priority information that reflects the processing priority information (act 360).

In some embodiments, the system periodically determines a minimum time to a next failure state for the one or more storage data sets and a total quantity of available next failure states before the one or more storage data sets are in a total failure state. This determination can be made by periodically for data sets and storage units associated with each of the enqueued recovery requests by querying the tagging information in the different recovery operations and/or by querying the degradation and priority state table(s) 140.

Whenever a priority state of a storage unit and/or data set changes, the corresponding prioritization ordering of the different enqueued recovery requests is updated accordingly, so that the most critical recovery requests are dynamically processed first.

In some embodiments, the system is configured to schedule the ordering for dispatching the one or more recovery requests to the one or more storage units by determining a minimum time to recovery state for the one or more storage data sets and by determining a total quantity of recovery states to recover from. Again, the minimum time to a recovery state can be estimated by querying data and the total number of recovery states to recover from can be inferred from or queried from the degradation state table 140.

In some instances, the system is configured to schedule the ordering for dispatching the one or more recovery requests to the one or more storage units in such a way as to reduce the minimum time to recovery relative to the determined minimum time to next failure for the one or more storage data sets. The minimum time to recovery is based on information maintained in the degradation state table 140. This recovery time can be reduced by allocating additional processing threads and resources to operations associated with data sets that are down to a final copy or to critical set of symbols. The recovery time can also be reduced by moving corresponding operations earlier in the dispatching/processing queues. Likewise, resources can be pulled from other operations that are not critical.

Reducing the minimum time to recovery relative to the determined minimum time to next failure can also be accomplished by extending the time to next failure by scheduling maintenance on corresponding storage units and/or by routing ancillary operations away from the corresponding storage units to other storage units that are determined to not be as susceptible to an imminent failure.

In some instances, the minimum time to next failure for one or more of the storage data sets corresponds directly to a minimum time to next failure for the one or more storage units and is based on historical maintenance and use data associated with the storage units. As previously noted, these storage units can include any combination of one or more hardware storage drives, storage racks, hardware storage arrays, virtual storage drives or virtual network storage arrays.

In some embodiments, the system is specifically configured to schedule the ordering for dispatching the one or more recovery requests to the one or more storage units based on processing bandwidth of the one or more storage units, which is determined by querying the different storage units for their availability.

Once a scheduling priority is determined, corresponding processing priority information is generated in the form of tags, flags or pointers to other stored priority information for the one or more recovery requests. This information is tagged into the operation requests and/or the referenced priority/degradation tables 140.

An example will now be provided with reference to FIG. 1, in which a recovery request is tagged with prioritization information. By way of example, request 110 is received for dispatch from entity 102-1. Request 110 may be tagged with prioritizing data 112 that specifies a priority level or condition that is used to sort the request 110 relative to one or more other requests (e.g., request 120). This prioritizing data 112 may explicitly specify a relative priority level (e.g., high, medium, low) and/or a specific ordering (e.g., sequence number). The prioritization data 112 may also be inferentially specified by a particular type of flag or other reference contained within a data field of the operation request or by accessing data from a table (e.g., table 140) that is pointed to by the prioritization data 112.

The prioritizing data may be used to control the ordering of dispatch of the requests to the storage units, as well as the ordering of processing of the requests relative to one or more other operation requests received by a single storage unit or a designated grouping of storage units.

As indicated above, once a data set is down to a final copy and/or a final critical set of one or more partity symbols that are required for reconstruction of lost symbols, the data set can be flagged, tagged, or otherwise set to a critical priority setting within the degredation state table and/or the priority information 112. Then, when an operation corresponding to recovery of the data set is created, identified, dispatched or enqueued, that operation (e.g., recovery request 10) can be tagged with additional priority information that reflects the critical priority setting. In some instances, this also includes downgrading a priority of one or more other operations (e.g., request 120) that are not as critical and moving the critical operation into an earlier dispatching/processing order or slot relative to other operations.

Request priorities can also be upgraded or otherwise modified. For instance, request 120 having prioritization data 122 in a first format that is changed to a second format (e.g., prioritization data 122) based on updated information obtained from the table(s) 140 or another request (e.g, request 110).

When multiple operations are determined to have a same priority level/setting, there may be a priority bandwidth contest that needs to be resolved. In some instances, the system resolves these types of prioritization contests by giving preference to operations from entities that have higher LOS (level of service) or QOS (quality of service) settings with the system. In some embodiments, preference is given to operations associated with larger data sets than for operations associated with smaller data sets, due to estimated timing required for recovery. Alternatively, preference may be given to operations associated with smaller data sets than operations associated with larger data sets, due to the increased probability of making a recovery prior to a next failure.

In some embodiments, preference is given to operations associated with reconstruction of lost parity symbols over operations associated with making replicas of entire data sets. Alternatively, preference may be given to operations associated with operations associated with making replicas over operations associated with reconstruction of lost parity symbols. Preference may also be given to operations associated with storage units containing global partity symbols over operations associated with storage units that do not store global parity symbols.

In some embodiments, this priority conflict/resolution includes prioritizing the recovery request associated with a data set or storage unit that has suffered the greatest percentage of degredation/failure relative to a starting position, relative to other data sets/storage units. In some instances, the recovery request associated with a data set or storage unit that has suffered the fastest degredation/failure is prioritized over a given period of time, relative to other data sets/ storage units. In some instances, the priority conflict is resolved in favor of entity status or recovery request type.

In many embodiments, the initial prioritization and subsequent prioritizations (including prioritizations based on priority conflict/resolution) includes always prioritizing recovery requests associated with a data set or storage unit that is tagged as being in a critical priority state (e.g, down to a last copy or a last critical set of symbols) ahead of other recovery requests and I/O operations that are not associated with data sets/storage units down to a last copy or last critical set of symbols. Likewise, a request associated with a data set down to copy N will be prioritized ahead of a request associated with a data set down to copy N+1. When two or more recovery requests are tagged as corresponding to a same critical priority level or same quantity of copies, any of the foregoing prioritization policies can be used to resolve the priority conflicts.

Although the foregoing embodiment describes how to prioritize recovery requests prior to dispatch to the storage unit(s), it will be appreciated that the scheduling/prioritizing of the recovery requests can also occur subsequent to the dispatch of the recovery requests by the recovery scheduler.

Attention will now be directed to FIGS. 4, 5 and 6, which relate to embodiments for facilitating the prioritizing of recovery requests subsequent to dispatching of the recovery requests to the storage unit(s), either from the recovery scheduler or directly from one of the entities generating the request.

As shown in FIG. 4, a computing system 400 is illustrated which includes a plurality of entities (102-1, 102-2 through 102-N) that are configured to interface with one or more storage units, such as storage units (104*a*, 104*b*, 104*c*, 104*d*, 104*e*, 104*f*, 104*g*, 104*h*, 104*i*, 104*j* thru 104*n*). Each of these storage units can be configured with a dedicated lower level recovery scheduler, such as storage unit scheduler 150, or a shared/distributed storage unit scheduler. The various entities communicate with the storage unit schedulers directly or indirectly, such as through an upper layer recovery scheduler 106 or another entity.

FIG. 5 illustrates one embodiment of a storage unit scheduler 150. As shown, the storage unit scheduler 150 includes or is associated with a plurality of different components that enable the functionality for prioritizing and processing of recovery requests subsequent to initial dispatch to and/or receipt by the storage units. These different components include one or more processor(s) 510, interface(s) 520, a receiver 530, a sequencer 250 and a processing queue 560.

The processor(s) 510 implement computer-executable instructions that are stored on or that are accessible to a computing system that incorporates the storage unit scheduler 150 to implement the functionality described in reference to at least the flow diagram of FIG. 6.

The interface(s) 520 include input fields and selectable objects configured to receive user input which, when received, controls settings for establishing prioritization and scheduling of the I/O operations. The interface(s) 220 also facilitate communications between the other illustrated components of the storage unit scheduler 506, the table(s) 140, the recovery scheduler 106 and the various other entities.

The receiver 530 includes hardware and/or software for receiving and processing recovery requests and other I/O operations from the illustrated entities and or recovery scheduler 106.

The sequencer 540 includes hardware and/or software for sequencing the recovery requests and other I/O operations for processing by the storage units based on prioritization information contained within, referenced by, and/or that is otherwise associated with the received I/O operations. The sequencer 540 can also dynamically include and/or modify prioritization tagging information contained within or that is referenced by the recovery requests based on detected conditions associated with the different storage units and data sets, according to different policies, as described throughout this disclosure.

The sequencer 540 enqueues the recovery requests and other operations in a processing queue according to a particular order based on the prioritization information. During operation, the enqueued operations can be re-sequenced according to newly detected conditions associated with the different storage units and/or data sets. The newly detected conditions can be detected by the sequencer 540 evaluating other received requests and/or by evaluating data in the table(s) 140 and/or by receiving condition information from the storage units or other entities.

The processing queue 560 dispatches the enqueued I/O operations for processing by the corresponding storage unit according to a FIFO (first in first out) scheme and/or according to prioritization settings established at the interface(s) 520 and/or that are specified by the tagging information that is included with or referenced by the different operations.

Various priority resolution policies can be enforced by the sequencer 540, as described above, to address conflicts between requests having similar or the same priorities, and/or to change existing priorities.

FIG. 6 illustrates a flowchart 600 that includes a plurality of acts of a method that can be implemented by the storage unit scheduler 150, according to embodiments of this disclosure, for scheduling and/or prioritizing recovery requests according to priority valuations within the lower layer of a system that includes one or more processors, one or more storage units storing one or more data sets, and one or more storage devices having stored computer-executable instructions which are executable by the one or more processors to cause the computing system to at least instantiate or manage the storage unit scheduler 150.

As illustrated, one or more data sets are stored (act 610) within one or more of the storage units. Then, one or more recovery requests are received (act 620), corresponding to one or more data sets associated with the storage unit. Next, obtain processing priority information is generated or obtained for the one or more recovery requests (act 630). In some instances, at least some of the priority information is included with the request. In other embodiments, the request omits at least some or all of the priority information when it is initially received. The priority information can then be obtained from the table(s) or another source, such as the entities or another storage unit.

In some embodiments, the processing priority information is based on a priority valuation of a minimum time to next failure relative to a minimum time to next recovery for the corresponding data sets. In other embodiments, the priority information is based on a determination as to whether the request corresponds to a critical failure or priority level, as described above, such as when the request corresponds to a data set down to a final copy or critical set of symbols.

After obtaining the processing priority information (act 630), the storage unit scheduler generates the ordered sequence for processing the one or more recovery requests by the storage unit based on the processing priority information (act 640). This can include re-ordering the sequence based on newly detected information related to existing and/or new requests. This can also include any of the prioritization resolution policies described above. Then, the storage unit processes the one or more recovery requests in the ordered or re-ordered sequence (act 650).

In some instances, the storage unit processes the recovery requests (act 650) by making at least one copy of at least one portion of a data set or a corresponding parity symbol. The copied data can be copied to the same storage unit and/or sent to a different storage unit for storage. The copied data can include only a limited portion of a data set, a complete data set and even multiple copies of a data set.

In some instances, the processing of a recovery request (act 650) includes performing one or more XOR'ing processes to restore one or more lost parity symbols by using other symbols stored on the same storage unit or different storage units from the storage unit that is used to store the newly restored parity symbol(s).

As described above, the embodiments of FIGS. 1, 2 and 3 relate to embodiments for establishing prioritization of recovery requests prior to dispatch and the embodiments of FIGS. 4, 5 and 6 relate to embodiments for establishing prioritization of recovery requests subsequent to dispatch. It will be appreciated, however, that these embodiments are not mutually exclusive. In fact, to the contrary, the various embodiments of this disclosure can be combined in whole and/or in part. For instance, some embodiments of this disclosure include systems that are configured with both the upper layer recovery scheduler in addition to one and more lower layer storage unit schedulers to facilitate prioritizing of recovery requests prior to dispatch to and/or receipt by the storage unit(s), as well as prioritizing subsequent to dispatch to and receipt by the storage unit(s).

It will also be appreciated that the embodiments of this disclosure may include and/or be practiced by any specialized computer system(s) configured with one or more processors and computer-readable media that stores computer executable instructions that are executable by the one or more processors to cause implementation of the acts and functionality described above with regard to the disclosed embodiments. In some embodiments, the specialized computer system(s) are configured to include the upper layer recovery scheduler and/or the lower layer storage unit scheduler(s) described above.

Embodiments of the present invention may also comprise or utilize a special purpose or general-purpose computer including computer hardware, as discussed in greater detail below and computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, virtual machine systems, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors;
   one or more storage devices having stored computer-executable instructions which are executable by the one or more processors to cause the computing system to at least instantiate or manage a recovery scheduler;
   a plurality of storage units storing one or more copies of each of a first data set and a second data set;
   one or more data structures that include a minimum time to failure for the first data set and the second data set across the plurality of storage units, wherein the minimum time to failure for each respective data set is based, at least in part, on determining a total number of available next failure states for the respective data set, across the plurality of storage units, before it is in a total failure state; and
   the recovery scheduler, wherein the recovery scheduler is configured to at least:
      obtain a first recovery request corresponding to the first data set and a second recovery request corresponding to the second data set, each of the first recovery request and the second recovery request including an attached prioritization tag indicating an initial relative priority for executing the respective request;
      obtain, from the one or more data structures, the minimum time to failure for each of the first data set and the second data set;
      based on the obtained minimum time to failure for both the first data set and the second data set, schedule an ordering for dispatching the first and second recovery both the initial relative priority for the respective first and second recovery request and the obtained minimum time to failure received for the first data set and the second data set; and
      dispatch the first and second recovery requests to the one or more storage units based on the priority valuation.

2. The computing system of claim 1, wherein the recovery scheduler is further configured to schedule the ordering for dispatching the first or second recovery requests to the one or more storage units in such a way as to reduce the minimum time to recovery relative to the determined minimum time to next failure for the first or second data sets.

3. The computing system of claim 2, wherein the first and second data sets each comprise one or more data sets stored on the one or more storage units.

4. The computing system of claim 2, wherein the minimum time to next failure for the first or second data sets corresponds directly to a minimum time to next failure for the one or more storage units storing the first or second data sets.

5. The computing system of claim 4, wherein the one or more storage units comprises one or more of a hardware storage drive, a storage rack, or a hardware storage array.

6. The computing system of claim 4, wherein the one or more storage units comprises a virtual storage drive or virtual network storage array.

7. The computing system of claim 1, wherein the recovery scheduler is further configured to schedule the ordering for dispatching the first or second recovery requests to the one or more storage units by querying processing bandwidth of the one or more storage units.

8. The computing system of claim 1, wherein the recovery scheduler is further configured to schedule the ordering for dispatching the first or second recovery requests to the one or more storage units by generating processing priority information for at least the first or second recovery requests.

9. The computing system of claim 8, wherein the recovery scheduler is further configured to dispatch the one or more recovery requests by attaching the processing priority information to the one or more recovery requests with one or more tags or flags that reflect the processing priority information.

10. The computing system of claim 1, wherein the minimum to failure for the first data set is also included within the attached prioritization tags included with the first recovery request and the second recovery request.

11. The computing system of claim 1, wherein the priority valuation is further based on determining, from the one or more data structures, which of the first data set or the second data set has experienced a greater percentage of degradation relative to a starting position.

12. The computing system of claim 1, wherein, subsequent to dispatching the first and second recovery requests, the one or more data structures are updated to reflect the result of the respective recovery requests.

13. A method, executed at one or more processors of a computing system, for scheduling processing of recovery requests at a storage unit, the method comprising:
receiving, at a storage unit scheduler, a first recovery request corresponding to a first data set and a second recovery request corresponding to a second data set, each of the first data set and second data set being stored within one or more of a plurality of storage units, and each of the first recovery request and the second recovery request including an attached prioritization tag indicating an initial relative priority for executing the respective request;
obtaining, from within the attached prioritization tag a minimum time to failure for the first data set and the second data set across the plurality of storage units, wherein the minimum time to failure for each respective data set is based, at least in part on determining a total number of available next failure states for the respective data set, across the plurality of storage units, before the respective data set is in a total failure state;
generating, at the storage unit scheduler, an ordered sequence for processing the first and second recovery requests by the storage unit based on the initial relative priority and the obtained minimum time to failure for the first data set and the second data set obtained from the attached prioritization tag; and
causing, at the storage unit scheduler, the storage unit to process the first and second recovery requests based on the priority valuation.

14. The method of claim 13, wherein processing the first and second recovery requests in the ordered sequence includes causing a new copy of the first or second data sets to be written to the storage unit.

15. The method of claim 13, wherein processing the first and second recovery requests in the ordered sequence includes causing the first or second data sets to read from the storage unit to be copied to at least one of a different location in the storage unit or to a different storage unit.

16. The method of claim 13, wherein processing the first and second recovery requests in the ordered sequence includes causing a restoration of the first or second data sets from parity symbols contained within at least one of a different location in the storage unit or a different storage unit.

17. A computing system comprising:
one or more processors;
one or more storage devices having stored computer-executable instructions which are executable by the one or more processors to cause the computing system to at least instantiate or manage a recovery scheduler and a storage unit scheduler;
a plurality of storage units storing a plurality of data sets;
one or more data structures that include a minimum time to failure for the first data set and the second data set across the plurality of storage units, wherein the minimum time to failure for each respective data set is based, at least in part, on determining a total number of available next failure states for the respective data set, across the plurality of storage units, before it is in a critical failure state; and
the recovery scheduler that is configured to at least:
obtain a first recovery request corresponding to the first data set of the plurality of data sets and a second recovery request corresponding to the second data set of the plurality of data sets, each of the first recovery request and the second recovery request including a prioritization tag indicating an initial relative priority for executing the respective request;
determine, using the one or more data structures, that the first recovery request corresponds to a critical recovery request and that the second recovery requests corresponds to a non-critical recovery request;
schedule an ordering for dispatching the first and second recovery requests to the one or more storage units based on a priority valuation that places the critical recovery request ahead of the non-critical recovery request; and
dispatch the first and second recovery requests to the one or more storage units based on the priority valuation.

* * * * *